(12) United States Patent
Cho et al.

(10) Patent No.: US 12,003,797 B2
(45) Date of Patent: Jun. 4, 2024

(54) METHOD AND SYSTEM FOR ADAPTIVE DATA TRANSMISSION (71) Applicant: NAVER CORPORATION, Seongnam-si (KR)

(72) Inventors: Sungtak Cho, Seongnam-si (KR); Dongju Lee, Seongnam-si (KR); Young Soo Lee, Seongnam-si (KR); Hyemin Lee, Seongnam-si (KR); SungHo Kim, Seongnam-si (KR); Joon-kee Chang, Seongnam-si (KR)

(73) Assignee: NAVER CORPORATION, Seongnam-si (KR)

( * ) Notice: Subject to any disclaimer, the term of this patent is extended or adjusted under 35 U.S.C. 154(b) by 99 days.

(21) Appl. No.: 17/125,212

(22) Filed: Dec. 17, 2020

(65) Prior Publication Data
US 2021/0105517 A1   Apr. 8, 2021

Related U.S. Application Data (63) Continuation of application No. PCT/KR2019/006448, filed on May 29, 2019.

(30) Foreign Application Priority Data

Jun. 20, 2018 (KR) .................... 10-2018-0070579

(51) Int. Cl.
*H04N 21/2385* (2011.01)
*G06N 20/00* (2019.01)
*H04N 21/2187* (2011.01)
*H04N 21/234* (2011.01)
*H04N 21/24* (2011.01)
*H04N 21/647* (2011.01)

(52) U.S. Cl.
CPC ......... *H04N 21/2402* (2013.01); *G06N 20/00* (2019.01); *H04N 21/2187* (2013.01); *H04N 21/23406* (2013.01); *H04N 21/2385* (2013.01); *H04N 21/64738* (2013.01)

(58) Field of Classification Search
CPC ........... H04N 21/2402; H04N 21/2187; H04N 21/23406; H04N 21/2385; H04N 21/64738
See application file for complete search history.

(56) References Cited

U.S. PATENT DOCUMENTS

2003/0152032 A1 * 8/2003 Yanagihara ........ H04N 21/2402
370/236.1
2005/0055512 A1 * 3/2005 Kishi ...................... G06F 3/061
711/E12.04
(Continued)

FOREIGN PATENT DOCUMENTS

JP    2014112779 A    6/2014
KR    101182550 B1    9/2012
(Continued)

*Primary Examiner* — Pinkal R Chokshi
(74) *Attorney, Agent, or Firm* — GREER BURNS & CRAIN, LTD.

(57) ABSTRACT

A video transmission control method for adaptive data transmission includes predicting a network state through machine learning using information related to video transmission as a feature in a real-time video streaming environment; and determining an option for controlling video transmission on the basis of the predicted network state.

21 Claims, 9 Drawing Sheets (56) References Cited

U.S. PATENT DOCUMENTS

| | | | | |
|---|---|---|---|---|
| 2006/0095472 | A1* | 5/2006 | Krikorian | H04N 19/107 |
| | | | | 375/E7.193 |
| 2009/0254657 | A1* | 10/2009 | Melnyk | H04N 21/6583 |
| | | | | 709/224 |
| 2011/0261881 | A1* | 10/2011 | Gunatilake | H04N 21/23406 |
| | | | | 375/240.12 |
| 2011/0302236 | A1* | 12/2011 | Shrum, Jr. | H04N 21/6582 |
| | | | | 709/203 |
| 2012/0284544 | A1* | 11/2012 | Xian | G06F 3/061 |
| | | | | 711/159 |
| 2014/0244857 | A1* | 8/2014 | Hahm | H04L 65/80 |
| | | | | 709/231 |
| 2014/0362688 | A1* | 12/2014 | Zhang | H04L 41/0896 |
| | | | | 370/230 |
| 2015/0011311 | A1* | 1/2015 | Relan | A63F 13/61 |
| | | | | 463/31 |
| 2016/0192029 | A1* | 6/2016 | Bergstrom | H04L 65/4076 |
| | | | | 725/109 |
| 2018/0220170 | A1* | 8/2018 | Yu | H04N 21/23106 |
| 2019/0141374 | A1* | 5/2019 | McAuley | H04N 21/6373 |

FOREIGN PATENT DOCUMENTS

| | | |
|---|---|---|
| KR | 1020140140364 A | 12/2014 |
| KR | 1020150138774 A | 12/2015 |
| KR | 1020170101287 A | 9/2017 |
| KR | 1020180013893 A | 2/2018 |

* cited by examiner

METHOD AND SYSTEM FOR ADAPTIVE DATA TRANSMISSION

CROSS-REFERENCE TO RELATED APPLICATIONS

This is a continuation application of International Application No. PCT/KR2019/006448 filed May 29, 2019, which claims the benefit of Korean Patent Application No. 10-2018-0070579 filed Jun. 20, 2018.

BACKGROUND OF THE INVENTION

Field of Invention

Example embodiments of the following description relate to technology for streaming video data in real time.

Description of Related Art

In general, the Internet transmits and receives data based on a packet unit. Here, a transmission bandwidth between two terminals for communication is not guaranteed at all times. Therefore, once a route is selected, data transmission and reception may be performed by dynamically occupying a bandwidth based on each packet unit.

In the case of a real-time video data streaming service, a service that satisfies quality of service (QoS) by transmitting video data through adjustment of a bitrate and frames per second (FPS) of the video data based on a transmission bandwidth of a current network may be provided.

Here, technology for measuring the bandwidth of data actually transmittable in transmitting data over a network plays a very important role. For example, technology for measuring the bandwidth of a mobile transmission in real time is described in Korean Patent Registration No. 10-1182550, registered on Sep. 6, 2012.

BRIEF SUMMARY OF THE INVENTION

One or more example embodiments provide technology for estimating a network state in real time using a machine learning scheme and transmitting a video through a strategy optimized for the estimated network state.

According to at least one example embodiment, there is provided a video transmission control method performed by a server implemented by a computer, the video transmission control method including estimating a network state through machine learning using information related to a video transmission as a feature in a real-time video streaming environment; and determining an option for controlling the video transmission based on the estimated network state.

According to one aspect of the invention, the estimating of the network state may include estimating an element that represents a current network state and an element that represents a future network state through machine learning.

According to another aspect, the estimating of the network state may include estimating a current network state through machine learning using transmission buffer data including at least one of a buffer size that represents a size of not-transmitted data in a transmission buffer, a buffer duration that represents a playback time of the not-transmitted data in the transmission buffer, and a throughput that represents a data transmission amount per time unit.

According to still another aspect, the estimating of the network state may include estimating the current network state and a future network state through machine learning using the transmission buffer data and transmission buffer data corresponding to a desired previous time.

According to still another aspect, the estimating of the network state may include estimating the network state through machine learning using at least one of connection type information and communication provider information as information related to a communication network.

According to still another aspect, the estimating of the network state may include estimating a current network state that includes at least one of an estimated bandwidth and transmission buffer data, and a future network state that includes at least one of a network stability, a bandwidth delta amplitude, a bandwidth delta, and a bandwidth delta confidence through machine learning.

According to still another aspect, the determining of the option may include selecting an algorithm of an option corresponding to the estimated network state from among a plurality of algorithms in each of which a video transmission option is differently set based on the network state.

According to still another aspect, the determining of the option may include selecting an algorithm of an option corresponding to the estimated network state from among a plurality of algorithms in each of which a video transmission option is differently set based on the network state using a method of classifying the network state through machine learning using a plurality of decision trees.

According to still another aspect, the determining of the option may include determining at least one of a bitrate, frames per second (FPS), and a buffer flush rate as a parameter controllable when transmitting video data based on the estimated network state.

According to still another aspect, the determining of the option may include calculating at least one parameter among a bitrate, FPS, and a buffer flush rate as a video transmission option according to the estimated network state, using a regression scheme using a machine learning scheme.

According to at least one example embodiment, there is provided a non-transitory computer-readable record medium storing a program to computer-implement the video transmission control method.

According to at least one example embodiment, there is provided a video transmission control system implemented by a computer, the video transmission control system including at least one processor configured to execute computer-readable instructions included in a memory. The at least one processor includes a network state estimator configured to estimate a network state through machine learning using information related to a video transmission as a feature in a real-time video streaming environment; and a video transmission controller configured to determine an option for controlling the video transmission based on the estimated network state.

According to example embodiments, it is possible to support seamless live transmission with possible highest quality in various network environments by estimating a network state in real time using a machine learning scheme and by transmitting a video through a strategy optimized for the estimated network state.

DETAILED DESCRIPTION OF THE INVENTION

Hereinafter, example embodiments will be described with reference to the accompanying drawings.

The example embodiments relate to technology for streaming video data in real time, and more particularly, to a method and a system for estimating a network state in real time and transmitting a video through a strategy optimized for the estimated network state.

The example embodiments including disclosures described herein may estimate a network state in real time and may perform a video transmission through a strategy optimized for the estimated network state and, through this, may achieve many advantages in terms of quality improvement, efficiency, and cost savings.

Figure 1:
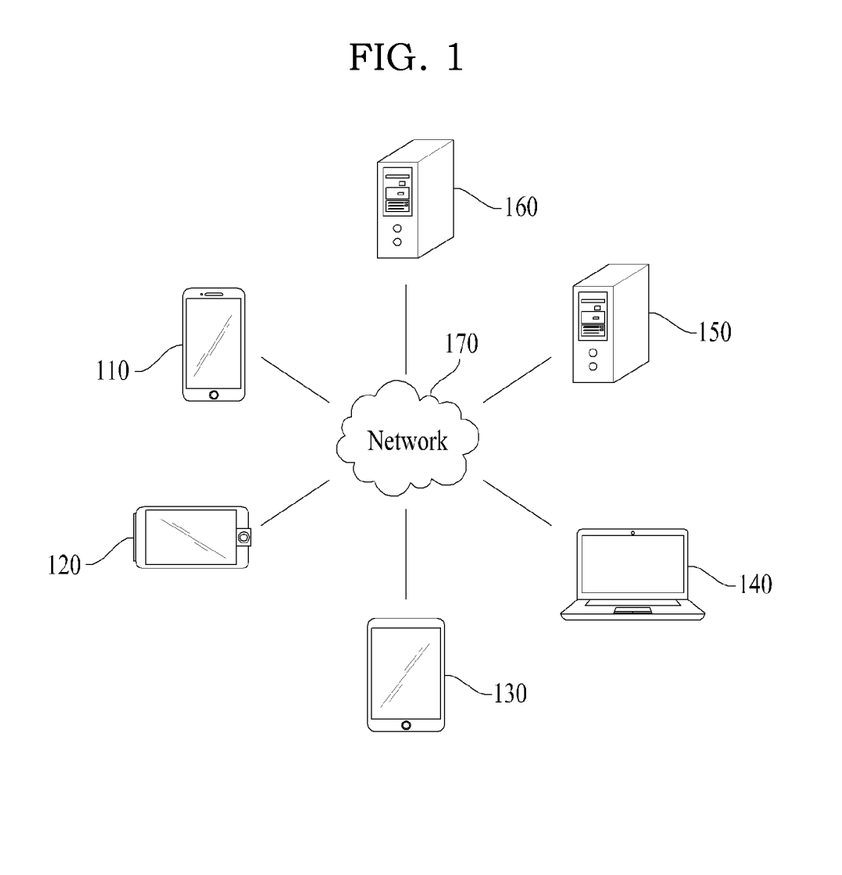
FIG. 1 is a diagram illustrating an example of a network environment according to an example embodiment.

FIG. 1 is a diagram illustrating an example of a network environment according to an example embodiment. Referring to FIG. 1, the network environment includes a plurality of electronic devices 110, 120, 130, and 140, a plurality of servers 150 and 160, and a network 170. FIG. 1 is provided as an example only and thus, a number of electronic devices or a number of servers is not limited thereto.

Each of the plurality of electronic devices 110, 120, 130, and 140 may be a fixed terminal or a mobile terminal configured as a computer apparatus. For example, the plurality of electronic devices 110, 120, 130, and 140 may be a smartphone, a mobile phone, a navigation device, a computer, a laptop computer, a digital broadcasting terminal, a personal digital assistant (PDA), a portable multimedia player (PMP), a tablet personal computer (PC), a game console, a wearable device, an Internet of things (IoT) device, a virtual reality (VR) device, an augmented reality (AR) device, and the like. For example, although FIG. 1 illustrates a shape of a smartphone as an example of the electronic device 110, the electronic device 110 may refer to one of various physical computer apparatuses capable of communicating with other electronic devices 120, 130, and 140 and/or the servers 150 and 160 over the network 170 in a wireless communication manner or in a wired communication manner.

The communication scheme is not particularly limited and may include a communication method using near field communication between devices as well as a communication method using a communication network, for example, a mobile communication network, the wired Internet, the wireless Internet, a broadcasting network, a satellite network, etc., which may be included in the network 170. For example, the network 170 may include at least one of network topologies that include, for example, a personal area network (PAN), a local area network (LAN), a campus area network (CAN), a metropolitan area network (MAN), a wide area network (WAN), a broadband network (BBN), and the Internet. Also, the network 170 may include at least one of network topologies that include a bus network, a star network, a ring network, a mesh network, a star-bus network, a tree or hierarchical network, and the like. However, these are provided as examples only and the example embodiments are not limited thereto.

Each of the servers 150 and 160 may be configured as a computer apparatus or a plurality of computer apparatuses that provides instructions, codes, files, contents, services, and the like, through communication with the plurality of electronic devices 110, 120, 130, and 140 over the network 170. For example, the server 150 may be a system that provides a first service to the plurality of electronic devices 110, 120, 130, and 140 connected over the network 170. The server 160 may be a system that provides a second service to the plurality of electronic devices 110, 120, 130, and 140 connected over the network 170. In detail, for example, the server 150 may provide a service, for example, a video service, desired by a corresponding application to the plurality of electronic devices 110, 120, 130, and 140, as the first service through the application, as a computer program, installed and executed on the plurality of electronic devices 110, 120, 130, and 140. As another example, the server 160 may provide, as the second service, a service that distributes a file for installing and executing the application to the plurality of electronic devices 110, 120, 130, and 140.

Figure 2:
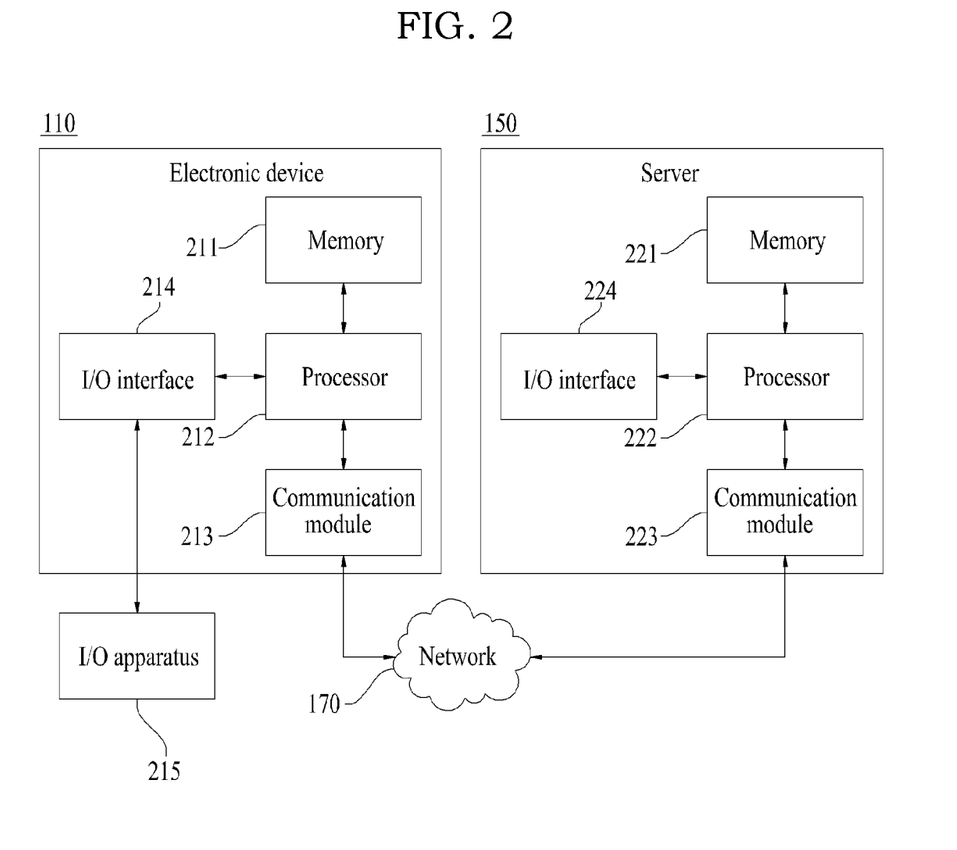
FIG. 2 is a block diagram illustrating a configuration of an electronic device and a server according to an example embodiment.

FIG. 2 is a block diagram illustrating an example of an electronic device and a server according to an example embodiment. FIG. 2 illustrates a configuration of the electronic device 110 as an example for a single electronic device and a configuration of the server 150 as an example for a single server. The same or similar components may be applicable to other electronic devices 120, 130, and 140, or the server 160.

Referring to FIG. 2, the electronic device 110 may include a memory 211, a processor 212, a communication module 213, and an input/output (I/O) interface 214, and the server 150 may include a memory 221, a processor 222, a communication module 223, and an I/O interface 224. The memory 211, 221 may include a permanent mass storage device, such as a random access memory (RAM), a read only memory (ROM), a disk drive, a solid state drive (SSD), and a flash memory, as a non-transitory computer-readable record medium. The mass storage device, such as ROM, SSD, flash memory, and disk drive, may be included in the electronic device 110 or the server 150 as a permanent storage device separate from the memory 211, 221. Also, an OS or at least one program code, for example, a code for a browser installed and executed on the electronic device 110 or an application installed and executed on the electronic device 110 to provide a specific service, may be stored in the memory 211, 221. Such software components may be loaded from another non-transitory computer-readable record medium separate from the memory 211, 221. Another non-transitory computer-readable record medium may include, for example, a floppy drive, a disk, a tape, a DVD/CD-ROM drive, a memory card, etc. According to other example embodiments, software components may be loaded to the memory 211, 221 through the communication module 213, 223, instead of the non-transitory computer-readable record medium. For example, at least one computer program may be loaded to the memory 211, 221 by files provided over the network 170 from developers or a file distribution system, for example, the server 160, which provides an installation file of an application.

The processor 212, 222 may be configured to process instructions of a computer program by performing basic arithmetic operations, logic operations, and I/O operations. The instructions may be provided from the memory 211, 221 or the communication module 213, 223 to the processor 212, 222. For example, the processor 212, 222 may be configured to execute received instructions in response to the program code stored in the storage device, such as the memory 211, 221.

The communication module 213, 223 may provide a function for communication between the electronic device 110 and the server 150 over the network 170 and may provide a function for communication between the electronic device 110 and/or the server 150 and another electronic device, for example, the electronic device 120, or another server, for example, the server 160. For example, the processor 212 of the electronic device 110 may transfer a request created based on a program code stored in the storage device, such as the memory 211, to the server 150 over the network 170 under control of the communication module 213. Inversely, a control signal, an instruction, content, a file, etc., provided under the control of the processor 222 of the server 150 may be received at the electronic device 110 through the communication module 213 of the electronic device 110 by going through the communication module 223 and the network 170. For example, a control signal, an instruction, content, a file, etc., of the server 150 received through the communication module 213 may be transferred to the processor 212 or the memory 211, and content, a file, etc., may be stored in a record medium, for example, a permanent storage device, further includable in the electronic device 110.

The I/O interface 214 may be a device used for interfacing with an I/O device 215. For example, an input device of the I/O device 215 may include a device, such as a keyboard, a mouse, a microphone, and a camera, and an output device of the I/O device 215 may include a device, such as a display, a speaker, and a haptic feedback device. As another example, the I/O interface 214 may be a device for interfacing with an apparatus in which an input function and an output function are integrated into a single function, such as a touchscreen. The I/O device 215 may be configured to be combined into as a single device with the electronic device 110. Also, the I/O interface 224 of the server 150 may be a device for interfacing with an input/output apparatus (not shown) that may be connected to the server 150 or included in the server 150. In detail, when processing instructions of the computer program loaded in the memory 211, the processor 212 of the electronic device 110 may display a service screen configured using data provided from the server 150 or the electronic device 120, or may display content on a display through the I/O interface 214.

According to other example embodiments, the electronic device 110 and the server 150 may include a greater number of components than the number of components shown in FIG. 2. However, there is no need to clearly illustrate many components known in the related art. For example, the electronic device 110 may include at least a portion of the I/O device 215, or may further include other components, for example, a transceiver, a global positioning system (GPS) module, a camera, a variety of sensors, a database (DB), and the like. In detail, if the electronic device 110 is a smartphone, the electronic device 110 may be configured to further include a variety of components, for example, an accelerometer sensor or a gyro sensor, a camera module, various physical buttons, a button using a touch panel, an I/O port, a vibrator for vibration, etc., which are generally included in a smartphone.

Hereinafter, example embodiments of a method and a system for adaptive data transmission in a real-time video streaming environment are described.

Figure 3:
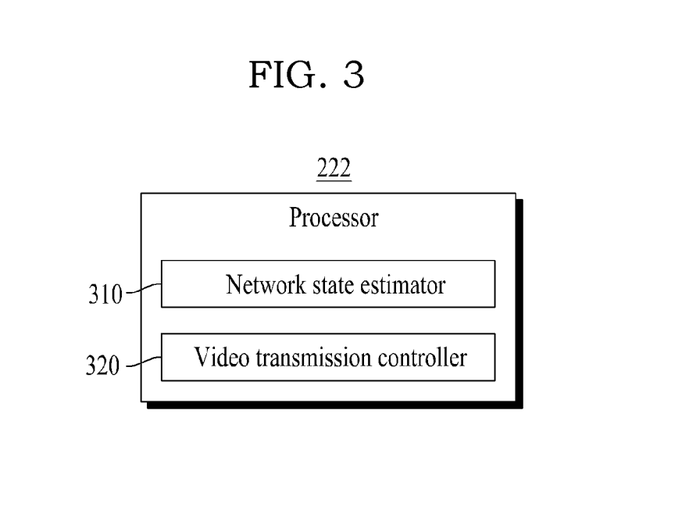
FIG. 3 is a block diagram illustrating an example of a component includable in a processor of a server according to an example embodiment.
Figure 4:
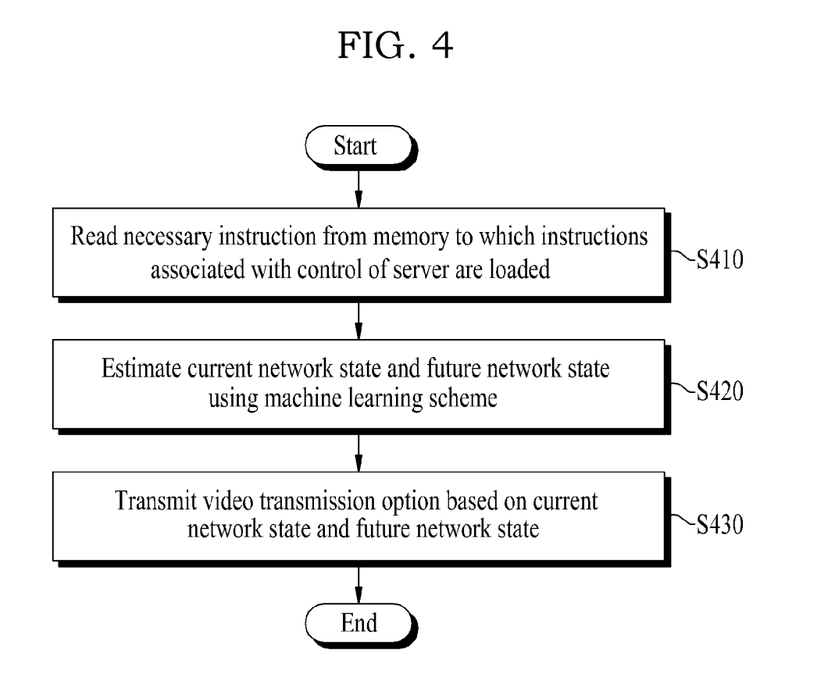
FIG. 4 is a flowchart illustrating an example of a method performed by a server according to an example embodiment.

FIG. 3 is a diagram illustrating an example of a component includable in a processor of a server according to an example embodiment, and FIG. 4 is a flowchart illustrating an example of a method performed by a server according to an example embodiment.

The server 150 according to the example embodiment functions as a platform that provides a real-time video streaming service to the plurality of electronic devices 110, 120, 130, and 140 that are clients. In particular, the server 150 may estimate a network state in real time and may transmit a video through a strategy optimized for the estimated network state.

For this, referring to FIG. 3, the processor 222 of the server 150 may include a network state estimator 310 and a video transmission controller 320 as components. Depending on example embodiments, the components of the processor 222 may be selectively included in or excluded from the processor 222. Also, depending on example embodiments, the components of the processor 222 may be separated or merged for representation of functions of the processor 222.

The processor 222 and the components of the processor 222 may control the server 150 to perform operations S410 to S430 included in the video transmission control method of FIG. 4. For example, the processor 222 and the components of the processor 222 may be configured to execute an instruction according to a code of at least one program and a code of an operating system (OS) included in the memory 221.

Here, the components of the processor 222 may be representations of different functions of the processor 222 performed by the processor 222 in response to an instruction provided from a program code stored in the server 150. For example, the network state estimator 310 may be used as a functional representation of the processor 222 that controls the server 150 to estimate a network state in response to the instruction.

In operation S410, the processor 222 may read necessary instructions from the memory 221 to which instructions associated with the control of the server 150 are loaded. In this case, the read instruction may include an instruction for controlling the processor 222 to perform the following operations S420 and S430.

In operation S420, the network state estimator 310 may estimate a current network state and a future network state using a machine learning scheme. The network state estimator 310 may estimate the future network state as well as the current network state through machine learning that uses a configuration of a transmission buffer managed on the side of the server 150 (e.g., a live transmission module) for video transmission, bitrate and frames per second (FPS) information of a video being previously/currently transmitted, a network throughput, and network information as features.

In operation S430, the video transmission controller 320 may determine the most appropriate video transmission option based on the current network state and the future network state estimated in operation S420. For example, the video transmission controller 320 may select a transmission algorithm appropriate for the network state from among transmission algorithms based on a rule directly designed by a service administrator through a machine learning-based classifier and may transmit video data. As another example, the video transmission controller 320 may immediately calculate video transmission parameters optimized for the network state using a regression scheme using a machine learning scheme and may transmit video data according to the determined video transmission option.

Figure 5:
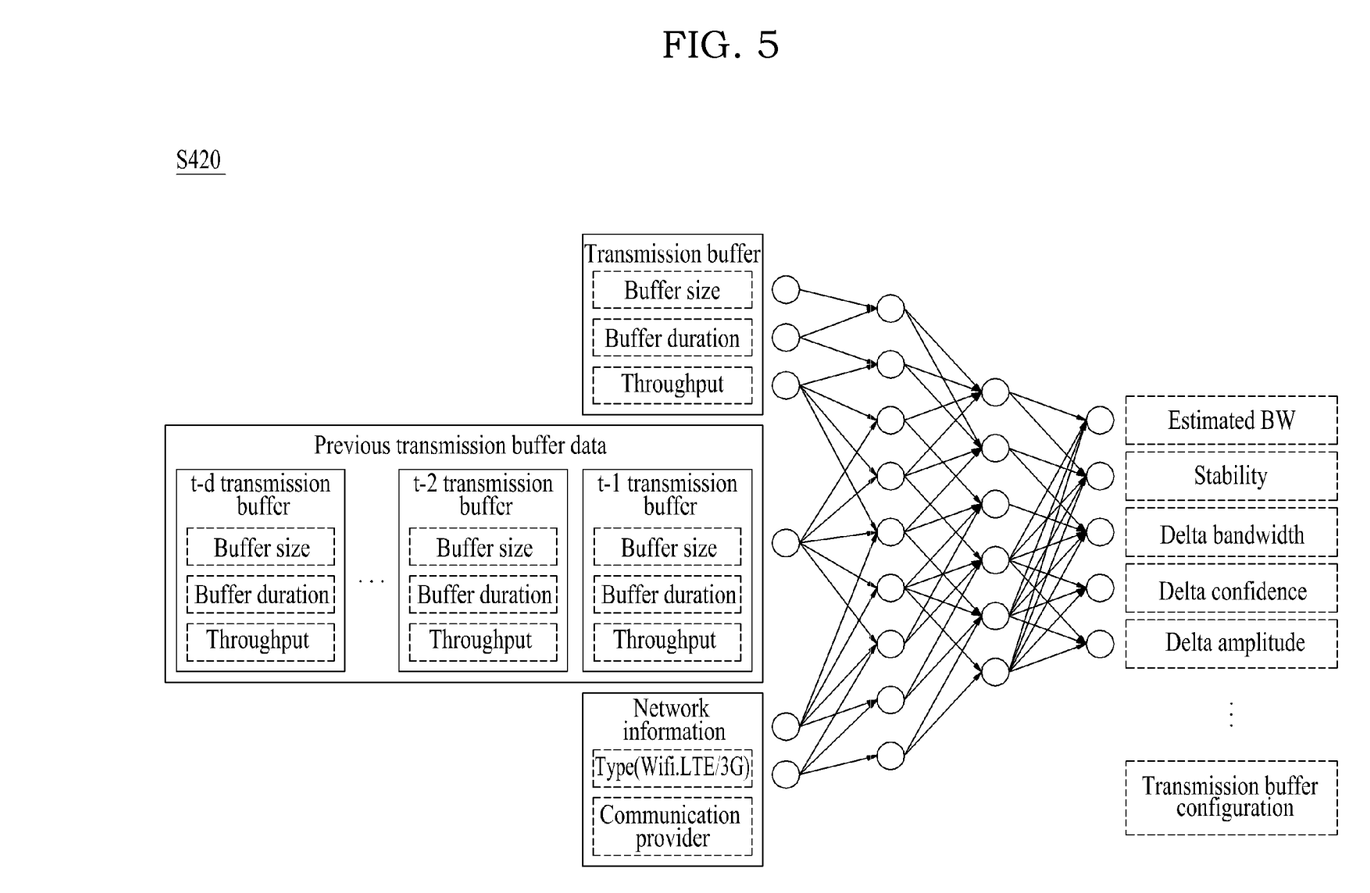
FIG. 5 illustrates an example of a diagram describing a process of estimating a network state according to an example embodiment.

FIG. 5 illustrates an example of a process (S420) of estimating a network state according to an example embodiment.

The network state estimator 310 functions to estimate a network state through machine learning. Here, elements corresponding to the network state have consecutive values and correspond to a regression issue in machine learning. An artificial neural network structure of FIG. 5 may be adapted to use complex input data. In the artificial neural network structure, a relationship between input data (elements used to estimate the network state) and output data (elements used to define the network state) is defined as an equation similar to matrix calculation and the relationship is estimated by adjusting the matrix. For learning, input data and priori data of the network state corresponding thereto may be secured and used. Using back-propagation learning through stochastic gradient descent (SGD), the capability of estimating the network state through the artificial neural network may be improved.

The following elements may be used to estimate the network state.

Initially, a configuration of a transmission buffer used as input data of the artificial neural network for machine learning may include a buffer size that represents a size of not-transmitted (buffered) data, a buffer duration that represents a playback time of a not-transmitted audio/video packet, and a throughput that represents a data transmission amount per time unit.

In the case of a live broadcast, video data is transmitted in a layer structure of an encoder (audio/video)→buffer-(transmission, network)→media server. If a throughput of the network is lower than a throughput of the encoder due to instability of the network, a not-transmitted audio/video bitstream may be stacked in the buffer.

Using a not-transmitted buffer size and duration information regarding the length of time data is stored in the buffer, a current network throughput and change state may be estimated.

Example 1) If a size of data remaining in a buffer is 300 kbps for video bitrate=1000 kbps, a bandwidth of a current network may be estimated to be 700 kbps (1000 Kbps−300 kbps=700 kbps) or less. However, in the case of changing a bitrate based on the above information alone, a relatively long time is used to transmit an I-Frame with a relatively large size, which may cause buffering to repeatedly occur.

Example 2) If a duration of data remaining in a buffer is 0.3 seconds for video bitrate=1000 kbps, a bandwidth of a current network may be estimated to be 700 kbps (1000 Kbps×0.7) or less. However, if a difference between sizes of the respective video frames is great, an error may increase.

A current network state may be further precisely estimated by referring to all of a buffer size and duration information based on the aforementioned examples.

Previous transmission buffer data (transmission buffer data during a d-time step (i.e., a time step from the past point in time "d" to the present point in time)) may be used as input data of an artificial neural network for machine learning.

In the case of using contents about a configuration of previous "d" number of transmission buffers as input data of the artificial neural network, information about a change trend of the network state from the past to the present time may be acquired. In the case of using previous transmission buffer data as input data, the current network state may be further precisely estimated and a future change in the network state may be estimated.

In addition, network information may be used as input data of the artificial neural network for machine learning.

The network information refers to information related to a communication network includable in the network 170 for connection to the plurality of electronic devices 110, 120, 130, and 140, and may include connection type information (e.g., long term evolution (LTE), 3rd generation (3G), wireless fidelity (WiFi), and wired communication network) and communication provider information (e.g., SKT, KT, and LG U+).

The server 150 may be a system that provides a first service to the plurality of electronic devices 110, 120, 130, and 140 connected over the network 170, and the server 160 may be a system that provides a second service to the plurality of electronic devices 110, 120, 130, and 140 connected over the network 170.

Approximate stability and bandwidth of a network may be estimated through access type information. Wired communication may enable relatively stable transmission compared to wireless communication and may have a higher bandwidth. Further, since an increase and decrease pattern of a network bandwidth may differ for each access type, information regarding how to change in response to a change in the network state may be acquired, which may be used to further precisely estimate the network state. Also, since a network characteristic may differ for each communication provider even for the same access type, communication provider information may also be used to improve the estimate precision of the network state.

A network state that may be estimated from the aforementioned elements may include elements of Table 1.

TABLE 1

| Element | Description |
| --- | --- |
| Estimated bandwidth | Describes a maximum transmittable bandwidth in a current network state. |
| Network stability | Describes a stability of a current network state. |
| Bandwidth delta amplitude | Describes a difference between a maximum value and a minimum value of an estimated bandwidth observed in a fixed time frame. |
| Bandwidth delta | Describes an estimate value about a future change in a bandwidth. |
| Bandwidth delta confidence | Describes a confidence about a change rate of a bandwidth. |
| Configuration of transmission buffer | Describes a configuration of a current transmission buffer. |

The network stability describes how stably a network operates. A mobile network may not readily use a current estimated bandwidth since the mobile network has a relatively great bandwidth change compared to that of a wired network. However, in a stable network environment, such as a wired network or wireless fidelity (WIFI), the estimated bandwidth may be further aggressively used. The bandwidth delta confidence describes a degree of reliability of a future network bandwidth estimated based on previous network information. For example, when a network recovers rapidly after a temporarily sharp decline in the past and has been stable for a desired period of time, an estimated future network delta may be regarded to have a high confidence. On the contrary, when the network unstably changes, such as a temporary sharp decline and recovery and then a sharp decline, the confidence may be regarded to be low. That is, the bandwidth delta confidence represents how reliable the estimated information may be in a situation in which a bandwidth of the current network continuously changes. Adaptive bitrate publishing technology refers to technology for estimating a network state and performing a most appropriate action in the estimated network state. The adaptive bitrate publishing technology adjusts image features based on the elements shown in Table 1. For example, a reference value for a bitrate or FPS of an image to be transmitted based on the estimated bandwidth may be set. As another example, the network stability and the bandwidth delta amplitude may be used to set a level at which a numerical value of the estimated bandwidth is applied to an image feature. For example, if the network stability is low and the bandwidth delta amplitude is large, a numerical value of the estimated bandwidth may not be trusted. In this case, the estimated bandwidth may be modified by reducing and thereby applying the effect instead of immediately applying the estimated bandwidth to the image feature. On the contrary, if the network stability is high, the estimated bandwidth may be further aggressively applied to the image feature to improve the user satisfaction. As another example, the bandwidth delta and the confidence may be used to identify a sharp decline, a decline, a rise, and a sharp rise of the estimated bandwidth in adjusting the image feature. Sensitivity may be differently applied for each of the decline and the rise of the estimated bandwidth when adjusting the image feature. For example, if the bandwidth is rising with high confidence, the sensitivity to a direction of increasing the image quality may be increased and the sensitivity to a direction of decreasing the image quality may be reduced. The user satisfaction may be maximized by adjusting the sensitivity in one direction. As another example, a configuration of a transmission buffer represents a current delay situation of the transmission buffer and may be used for adaptive bitrate publishing to determine whether to transmit or discard data present in the transmission buffer, which differs from an example of adjusting the image feature.

Figure 6A:
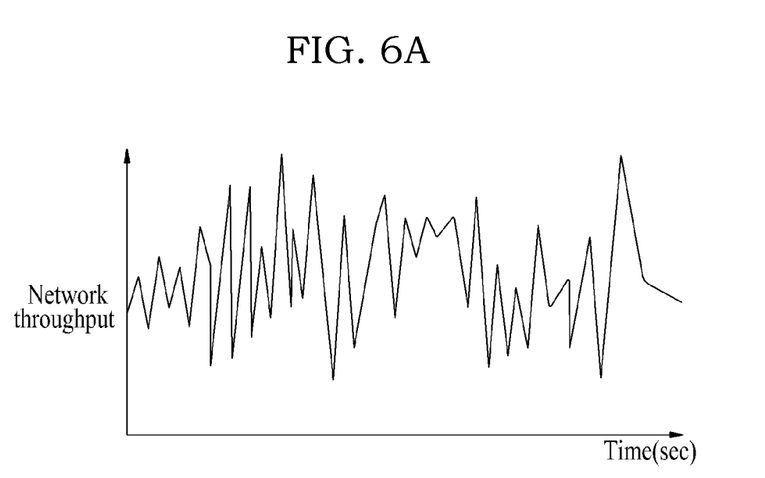
FIGS. 6A and 6B illustrate examples of charts describing a process of estimating a future network state according to an example embodiment.
Figure 6B:
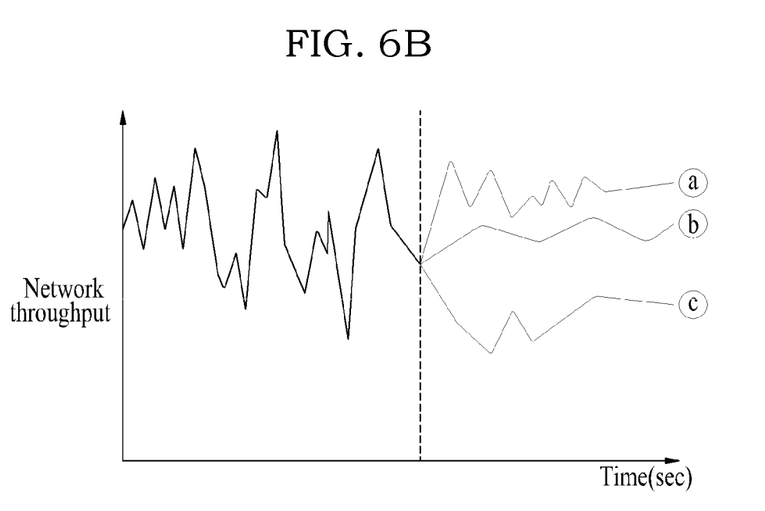

Referring to FIG. 6A, a throughput when streaming in an actual mobile environment is highly variable. Therefore, for high quality of service (QoS), a current network state may be estimated and a near future network state may be estimated using previous data (e.g., transmission buffer data during a d-time step) using a machine learning scheme. For example, referring to FIG. 6B, a more probable trend among 0, 0, and 0 in the near future may be estimated based on previous data. Among the elements of Table 1, the current network state may be represented using the estimated bandwidth and the transmission buffer configuration and the future network state may be represented using the network stability, the bandwidth delta amplitude, the bandwidth delta, and the bandwidth delta confidence.

Figure 7:
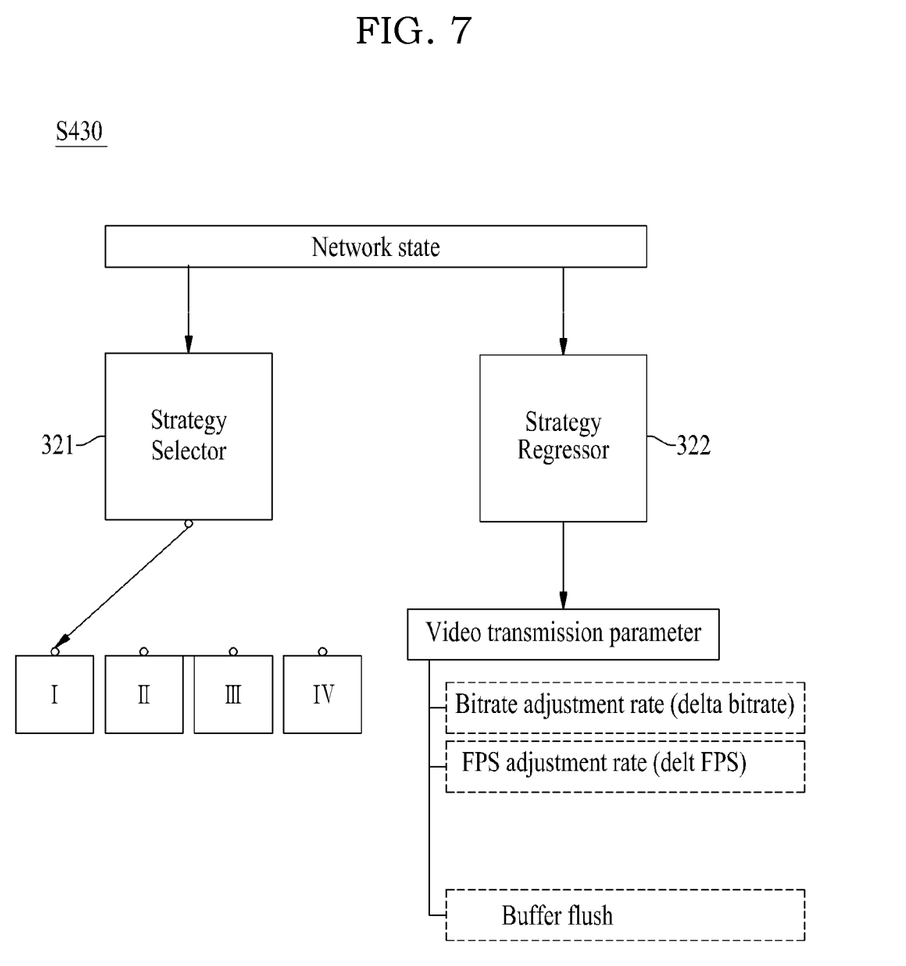
FIG. 7 illustrates an example of a diagram describing a process of determining a video transmission option based on a network state according to an example embodiment.

FIG. 7 illustrates an example of a process (S430) of determining a video transmission option based on a network state according to an example embodiment.

The video transmission controller 320 may determine a video transmission option based on an estimated network state. Here, the video transmission option refers to a parameter controller when transmitting video data and may include a bitrate, FPS, and buffer flush.

Figure 8:
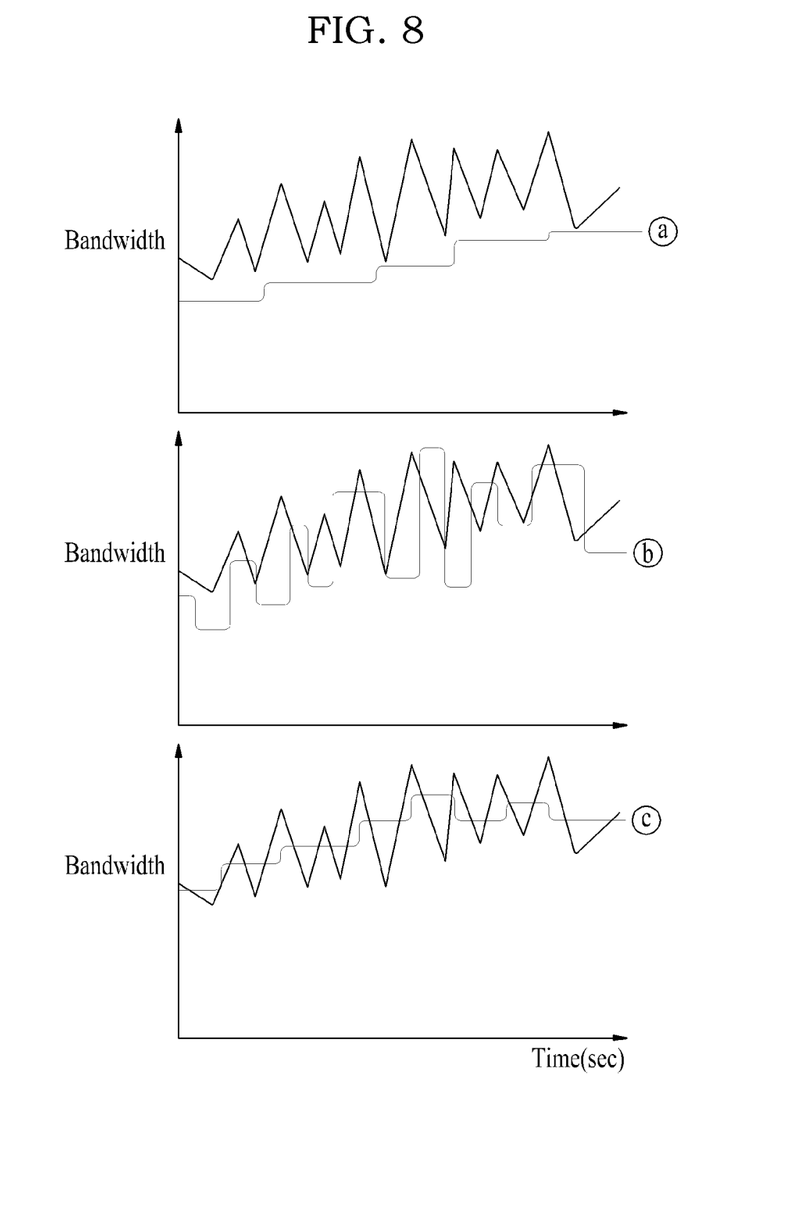
FIG. 8 illustrates examples of charts describing an adaptive bitrate publishing (ABP) algorithm according to an example embodiment.

An adaptive bitrate publishing algorithm, when transmitting a video, determines a method of coping with a change in the network state. In an environment in which a bandwidth changes as shown in FIG. 8, algorithm ⓐ does not fully cope with a change in the bandwidth and thus, does not fully use the change in the bandwidth. On the contrary, algorithm ⓑ is too sensitive to the change in the bandwidth, which causes buffering and a change in the image quality more than necessary and QoS is degraded accordingly. An optimal algorithm in the given environment is an algorithm capable of fully using the change in the bandwidth with appropriate sensitivity, such as algorithm ⓒ. That is, the optimal algorithm is an algorithm that quickly and precisely copes with a change in a network.

However, video transmission is performed in various environments. Therefore, if a video transmission option (e.g., a bitrate and FPS) is adjusted with a single rule-based algorithm, high QoS may not be maintained in various environments. As one method to overcoming the above issue, the high QoS may be maintained in a corresponding environment in such a manner that a service administrator designs rule-based algorithms optimized for each situation and environment and selects an algorithm suitable for a network situation from among a plurality of algorithms through a strategy selector 321 that is a machine learning-based classifier of FIG. 7. That is, the strategy selector 321 may select an algorithm suitable for each situation from among the rule-based algorithms designed by the service administrator.

The rule-based algorithms may be classified as shown in Table 2 depending on what is important in applying the elements of Table 1 to adjust the image feature.

TABLE 2

| Algorithm | Network stability | Bandwidth delta | Buffer flush |
|---|---|---|---|
| I | Average | Average | 50% |
| II | Conservative | Conservative | 60% |
| III | Sensitive | Sensitive | 30% |
| IV | Average | Sensitive | 100% |

Figure 9:
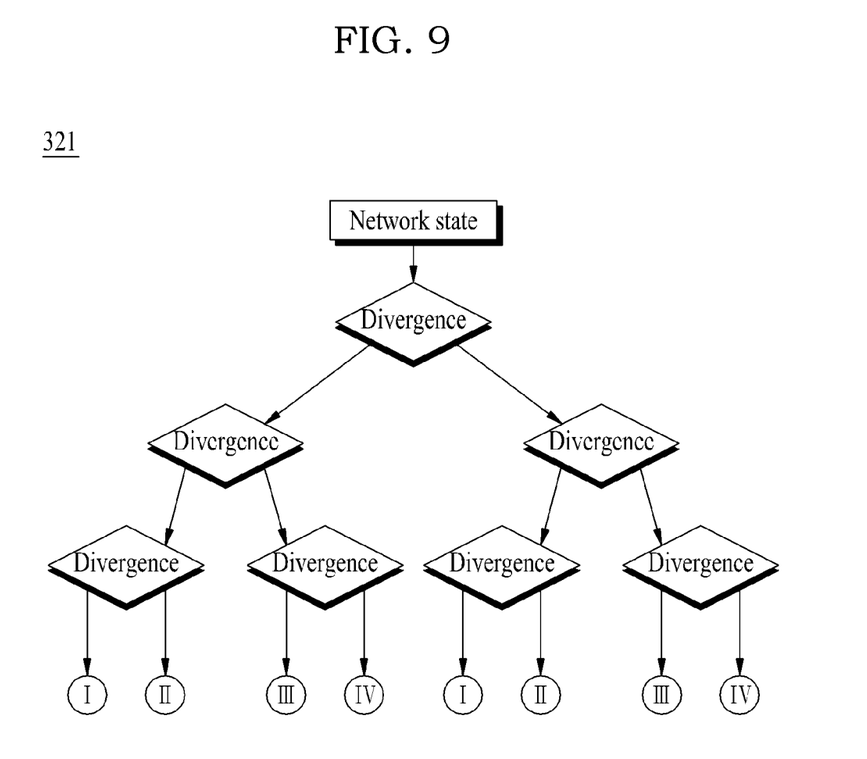
FIG. 9 illustrates an example of a machine learning model using a decision tree as a learning model configured to determine a video transmission strategy according to an example embodiment.

For example, to apply a numerical value of the estimated bandwidth to the image quality based on the network stability, a compromise needs to be made between the image quality and delay or buffering. Referring to Table 2, a different compromise point may be set for each of algorithms I to IV. For example, compared to algorithm I, algorithm II conservatively applies the estimated bandwidth to the image when the network exhibits the same stability. Therefore, the user satisfaction may be improved by uniformly transmitting an image in an unstable network state. In contrast, compared to other algorithms, algorithm III refers to an algorithm that improves the user satisfaction by quickly changing the quality of the image based on the estimated bandwidth. Not only the current estimated bandwidth but also future trend may be estimated in the image. Here, a ratio between two elements to be applied to the image may differ for each algorithm. The buffer flush refers to a ratio of discarding not-transmitted data in a transmission buffer and also may be differently set for each algorithm. Referring to FIG. 9, the strategy selector 321 needs to classify a current network state. It corresponds to a classification issue in machine learning and an algorithm such as a random forest may be used. The random forest refers to a machine learning algorithm that classifies input data using a plurality of decision trees. Here, in the decision tree, a test is consecutively performed for each element of a network state, a subsequent test is performed based on a result thereof, and the network state is classified based on a final location. In the case of learning, learning may be performed to match learning data that represents the network state and predefined network environment data.

Referring again to FIG. 7, as another example of determining a video transmission option based on a network state, a strategy regressor 322 may be used.

If the strategy selector 321 selects, as the video transmission option, an algorithm suitable for each situation from among rule-based algorithms directly designed by the service administrator, the strategy regressor 322 may acquire the high QoS by immediately calculating a strategy, such as a bitrate, BPS, and buffer flush, optimized for the network situation, through a regression scheme using a machine learning scheme and by transmitting a video with the calculated strategy.

Figure 10:
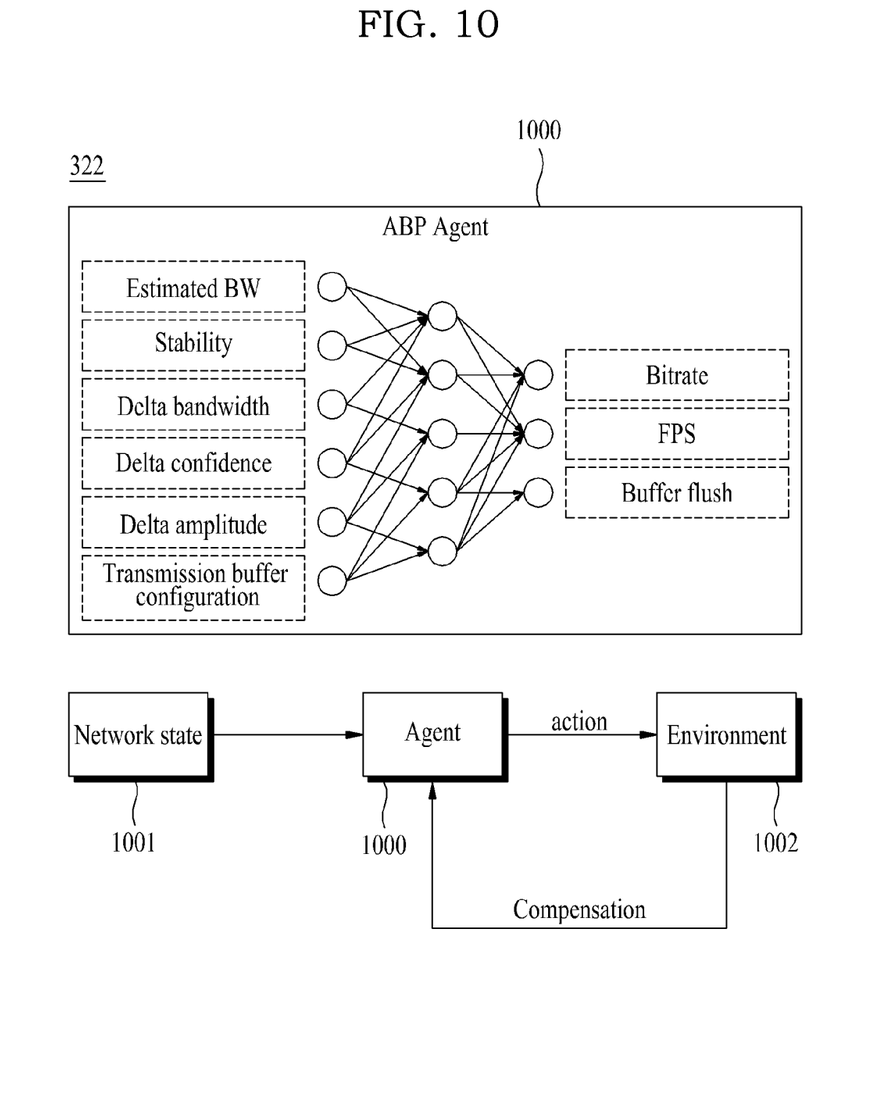
FIG. 10 illustrates an example of a machine learning model of a regression scheme as a learning model configured to determine a video transmission strategy according to an example embodiment.

The strategy regressor 322 solves a regression issue about a method of adjusting an image feature. Referring to FIG. 10, a method of adjusting a bitrate, FPS, and buffer flush corresponding to a video transmission option may be determined using an artificial neural network structure. The strategy regressor 322 may be trained to exhibit the optimal satisfaction in a dynamic network environment. Here, a reinforcement learning scheme may be used. For example, if user satisfaction is quantified and an action (i.e., a bitrate, FPS, and buffer flush) of an agent 1000 corresponding thereto is compensated, the agent may be trained to optimize the user satisfaction. If learning is performed based on learning data that represents various network states 1001, the agent 1000 may be trained to improve the user satisfaction in any environment 1002. In the present application, the agent 1000 self-recognizes changes in the network environment 1002, takes corresponding action, and has a function to learn based on experience.

The strategy selector 321 and the strategy regressor 322 may design an algorithm of adjusting a video transmission option optimized for each environment by repeatedly performing learning in various network environments since they are machine learning-based methods.

As described above, according to example embodiments, it is possible to support seamless live transmission with possible highest quality in various network environments by estimating a network state in real time using a machine learning scheme and by transmitting a video through a strategy optimized for the estimated network state.

The apparatuses described herein may be implemented using hardware components, software components, and/or a combination thereof. For example, the apparatuses and the components described herein may be implemented using one or more general-purpose or special purpose computers, such as, for example, a processing device, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. A processing device may run an operating system (OS) and one or more software applications that run on the OS. A processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring a processing device to operate as desired. Software and/or data may be embodied in any type of machine, component, physical equipment, computer storage medium or device, to be interpreted by the processing device or to provide an instruction or data to the processing device. The software also may be distributed over network coupled computer systems so that the software is stored and executed in a distributed fashion. The software and data may be stored by one or more computer readable storage media.

The methods according to the example embodiments may be configured in a form of program instructions performed through various computer devices and recorded in non-transitory computer-readable media. Here, the media may continuously store computer-executable programs or may transitorily store the same for execution or download. Also, the media may be various types of recording devices or storage devices in a form in which one or a plurality of hardware components are combined. Without being limited to media directly connected to a computer system, the media may be distributed over the network. Examples of the media include magnetic media such as hard disks, floppy disks, and magnetic tapes; optical media such as CD-ROM and DVDs; magneto-optical media such as floptical disks; and hardware devices that are specially configured to store program instructions, such as read-only memory (ROM), random access memory (RAM), flash memory, and the like. Examples of other media may include record media and storage media managed by an app store that distributes applications or a site that supplies and distributes other various types of software, a server, and the like.

While the example embodiments are described with reference to specific example embodiments and drawings, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, or replaced or supplemented by other components or their equivalents.

Therefore, other implementations, other example embodiments, and equivalents of the claims are to be construed as being included in the claims.

What is claimed is:

1. A video transmission control method performed by a server implemented by a computer, comprising:
designing a plurality of rule-based algorithms of video transmission options, where each of the rule-based algorithms is optimized differently;
estimating a network state through machine learning using information related to a video transmission as a feature in a real-time video streaming environment; and
determining an option for controlling the video transmission based on the estimated network state,
wherein the determining of the option comprises selecting a rule-based algorithm corresponding to the estimated network state from among the plurality of rule-based algorithms in each of which a video transmission option including at least two of a bitrate, frames per second (FPS), and a buffer flush rate are differently set based on the network state, wherein the selected rule-based algorithm utilizes the bitrate, and at least one of the FPS and the buffer flush rate as controllable parameters when transmitting video data, wherein the bitrate is adjusted in a first manner in one of the rule-based algorithms and the bitrate is adjusted in a second manner in another one of the rule-based algorithms, where the first manner is different from the second manner, and wherein in each of the rule-based algorithms, a different ratio between two of the following elements is relied upon:
(i) estimated bandwidth;
(ii) network stability;
(iii) bandwidth delta amplitude;
(iv) bandwidth delta confidence; and
(v) transmission buffer configuration.

2. The video transmission control method of claim 1, wherein the estimating of the network state comprises estimating an element that represents a current network state and an element that represents a future network state through the machine learning.

3. The video transmission control method of claim 1, wherein the estimating of the network state comprises:
estimating a current network state through the machine learning using transmission buffer data comprising at least one of a buffer size that represents a size of not-transmitted data in a transmission buffer, a buffer duration that represents a playback time of the not-transmitted data in the transmission buffer, and a throughput that represents a data transmission amount per time unit.

4. The video transmission control method of claim 3, wherein the estimating of the network state further comprises estimating a future network state through the machine learning using the transmission buffer data and transmission buffer data corresponding to a desired previous time.

5. The video transmission control method of claim 3, wherein the machine learning further includes using at least one of connection type information and communication provider information as information related to a communication network.

6. The video transmission control method of claim 1, wherein the estimating of the network state comprises estimating a current network state that comprises at least one of an estimated bandwidth and transmission buffer data, and a future network state that comprises at least one of a network stability, a bandwidth delta amplitude, a bandwidth delta, and a bandwidth delta confidence, through the machine learning.

7. The video transmission control method of claim 1, wherein the determining of the option comprises selecting a rule-based algorithm of an option corresponding to the estimated network state from among a plurality of rule-based algorithms in each of which a video transmission option is differently set based on the network state using a method of classifying the network state through the machine learning using a plurality of decision trees.

8. The video transmission control method of claim 1, wherein:
the determining of the option comprises determining at least two of a bitrate, frames per second (FPS), and a buffer flush rate as a controllable parameter when transmitting video data based on the estimated network state, and
the determining of the option also comprises calculating at least one parameter among the bitrate, the FPS, and the buffer flush rate as the video transmission option according to the estimated network state, using a regression scheme using a machine learning scheme that has a function to learn based on experience.

9. A non-transitory computer-readable record medium storing a program that, when executed by a computer, causes the computer to execute the video transmission control method according to claim 1.

10. The video transmission control method of claim 8, wherein the determining of the option comprises determining all three of the bitrate, the FPS and the buffer flush rate as controllable parameters when transmitting video data based on the estimated network state.

11. The video transmission control method of claim 1, wherein at least two of the rule-based algorithms include buffer flush rates that differ from each other.

12. The video transmission control method of claim 1, wherein the estimating of the network state comprises:
estimating a current network state that comprises at least one of an estimated bandwidth and transmission buffer data,
estimating a future network state that comprises an estimate of network stability; and
wherein the selecting of the rule-based algorithm is based, at least in part, on the estimated network stability.

13. A video transmission control system implemented by a computer, comprising:
at least one processor configured to execute computer-readable instructions comprised in a memory,
wherein the at least one processor comprises:
a network state estimator configured to estimate a network state through machine learning using information related to a video transmission as a feature in a real-time video streaming environment; and
a video transmission controller configured to determine an option for controlling the video transmission based on the estimated network state,
wherein the determining of the option comprises selecting a rule-based algorithm of an option corresponding to the estimated network state from among a plurality of rule-based algorithms in each of which a video transmission option including at least two of a bitrate, frames per second (FPS), and a buffer flush rate are differently set based on the network state,
wherein each of the plurality of rule-based algorithms of video transmission options has been designed to include a strategy optimized for a different network state and/or network environment,
wherein the selected rule-based algorithm utilizes the bitrate, and at least one of the FPS and the buffer flush rate as controllable parameters when transmitting video data,
wherein the bitrate is adjusted in a first manner in one of the rule-based algorithms and the bitrate is adjusted in a second manner in another one of the rule-based algorithms, where the first manner is different from the second manner, and
wherein in each of the rule-based algorithms, a different ratio between two of the following elements is relied upon:
(i) estimated bandwidth;
(ii) network stability;

(iii) bandwidth delta amplitude;
(iv) bandwidth delta confidence; and
(v) transmission buffer configuration.

14. The video transmission control system of claim 13, wherein the estimating of the network state includes estimating a current network state through the machine learning using transmission buffer data comprising at least one of a buffer size that represents a size of not-transmitted data in a transmission buffer, a buffer duration that represents a playback time of the not-transmitted data in the transmission buffer, and a throughput that represents a data transmission amount per time unit.

15. The video transmission control system of claim 14, wherein the estimating of the network state further includes estimating a future network state through the machine learning using the transmission buffer data and transmission buffer data corresponding to a desired previous time.

16. The video transmission control system of claim 14, wherein the machine learning further includes using at least one of connection type information and communication provider information as information related to a communication network.

17. The video transmission control system of claim 13, wherein the estimating of the network state includes estimating a current network state that comprises at least one of an estimated bandwidth and transmission buffer data, and a future network state that comprises at least one of a network stability, a bandwidth delta amplitude, a bandwidth delta, and a bandwidth delta confidence, through the machine learning.

18. The video transmission control system of claim 13, wherein the determining of the option includes selecting a rule-based algorithm of an option corresponding to the estimated network state from among a plurality of algorithms in each of which a video transmission option is differently set based on the network state using a method of classifying the network state through the machine learning using a plurality of decision trees.

19. The video transmission control system of claim 13, wherein:
the determining of the option includes determining at least two of a bitrate, frames per second (FPS), and a buffer flush rate as a controllable parameter when transmitting video data based on the estimated network state, and
the video transmission controller is also configured to calculate at least one parameter among the bitrate, the FPS, and the buffer flush rate as the video transmission option according to the estimated network state, using a regression scheme using a machine learning scheme that has a function to learn based on experience.

20. The video transmission control system of claim 19, wherein the determining of the option comprises determining all three of the bitrate, the FPS and the buffer flush rate as controllable parameters when transmitting video data based on the estimated network state.

21. A video transmission control method performed by a server implemented by a computer, comprising:
designing a plurality of rule-based algorithms of video transmission options, where each of the rule-based algorithms is optimized differently;
estimating a network state through machine learning using information related to a video transmission as a feature in a real-time video streaming environment; and
determining an option for controlling the video transmission based on the estimated network state,
wherein the determining of the option comprises selecting a rule-based algorithm corresponding to the estimated network state from among the plurality of rule-based algorithms in each of which a video transmission option including at least two of a bitrate, frames per second (FPS), and a buffer flush rate are differently set based on the network state, wherein the selected rule-based algorithm utilizes the FPS and the bitrate as controllable parameters when transmitting video data, and further wherein the bitrate is adjusted in a first manner in one of the rule-based algorithms and the bitrate is adjusted in a second manner in another one of the rule-based algorithms, where the first manner is different from the second manner; and
wherein in each of the rule-based algorithms, a different ratio between two of the following elements is relied upon:
(i) estimated bandwidth;
(ii) network stability;
(iii) bandwidth delta amplitude;
(iv) bandwidth delta confidence; and
(v) transmission buffer configuration.

* * * * *